(12) United States Patent
Yasuta et al.

(10) Patent No.: US 6,736,439 B2
(45) Date of Patent: May 18, 2004

(54) AUTOMOTIVE DASH MODULE INSTALLATION STRUCTURE AND METHOD OF INSTALLING SAME

(75) Inventors: Keigo Yasuta, Kanagawa-ken (JP); Takashi Takeuchi, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/873,216

(22) Filed: Jun. 5, 2001

(65) Prior Publication Data

US 2002/0008399 A1 Jan. 24, 2002

(30) Foreign Application Priority Data

Jun. 6, 2000 (JP) ........................ P2001-169188
May 10, 2001 (JP) ........................ P2001-139829

(51) Int. Cl.⁷ ............................................. B62D 25/14
(52) U.S. Cl. ................................. 296/72; 180/90
(58) Field of Search ............................... 296/72; 180/90

(56) References Cited

U.S. PATENT DOCUMENTS

| | | | | |
|---|---|---|---|---|
| 1,325,140 A | * | 12/1919 | Carson | |
| 4,733,739 A | * | 3/1988 | Lorenz et al. | |
| 5,282,637 A | * | 2/1994 | McCreadie | |
| 5,564,769 A | * | 10/1996 | Deneau et al. | |
| 5,787,550 A | * | 8/1998 | Bender | |
| 5,868,426 A | * | 2/1999 | Edwards et al. | |
| 5,904,367 A | * | 5/1999 | Warnez et al. | |
| 5,931,520 A | * | 8/1999 | Seksaria et al. | |
| 5,992,925 A | * | 11/1999 | Alberici | |
| 5,997,078 A | * | 12/1999 | Beck et al. | |
| 6,273,495 B1 | * | 8/2001 | Haba et al. | |
| 6,351,962 B1 | * | 3/2002 | Mizutani et al. | |

FOREIGN PATENT DOCUMENTS

| | | |
|---|---|---|
| DE | 41 34 436 A1 | 4/1992 |
| EP | 0 256 931 A1 | 2/1988 |
| JP | 6-199152 | 7/1994 |
| JP | 8-318760 | 12/1996 |

OTHER PUBLICATIONS

Norifumi: "Installation Structure for Instrument Panel," Patents Abstracts of Japan, vol. 2000, No. 16, May 8, 2001; JP 2001–001793, Jan. 9, 2001, Abstract.

* cited by examiner

*Primary Examiner*—Kiran Patel
(74) *Attorney, Agent, or Firm*—Foley & Lardner

(57) ABSTRACT

In front of a dash panel of a vehicle body, the dash module to which various parts are assembled, the various parts including an air conditioning unit and the like with a steering member extending in a vehicle width direction as a main constituent is installed. When the dash module is installed to the vehicle body, before heater pipes of the air conditioning unit are inserted to through hole portions of the dash panel, positioning pins at a vehicle body side enter upper and lower guide grooves of a bracket, which are provided in an end portion of the steering member at a driver's seat side, and a temporarily holding claw provided in an end portion of the steering member at a passenger's seat side is inserted to a temporarily holding hole portion at the vehicle body side.

9 Claims, 17 Drawing Sheets

AUTOMOTIVE DASH MODULE INSTALLATION STRUCTURE AND METHOD OF INSTALLING SAME

BACKGROUND OF THE INVENTION

1. Field of the Invention

The present invention relates to an automotive dash module installation structure in which a dash module having various parts assembled thereto with a steering member as a main constituent is installed to a dash portion of a vehicle body, and relates to a method of installing the same.

2. Description of the Related Art

In an assembling process of an automotive vehicle body, a method was adopted before, in which various parts in the vicinity of a dash of the vehicle body, that is, an air conditioning unit, a duct, an instrument panel, an audio unit, electric systems and the like were assembled to the vehicle body individually in order. However, in recent years, a method has been adopted, in which the foregoing various parts are previously formed as a dash module in one unit with the steering member extending in a vehicle width direction as a main constituent of the module, carried in a vehicle cabin, and assembled to the vehicle body (Please refer to the gazettes of Japanese Patent Application Laid-Open No. Hei 6 (1994)-199152 and Japanese Patent Application Laid-Open No. Hei 8 (1996)-318760).

Meanwhile, in the foregoing conventional installation structure, particularly in a type in which the air conditioning unit is assembled to the dash module, heater pipes as two protrusions provided in the air conditioning unit are required to be inserted to through hole portions provided in a dash panel and to be protruded to an engine room side.

However, the instrument panel covering assembly parts including the steering member is assembled to the dash module. Accordingly, insertion regions of the foregoing heater pipes to the dash panel through hole portions cannot be viewed due to this instrument panel. Therefore, the heater pipes abut on the dash panel and scrape rims of the through hole portions, thus causing damage to the heater pipes and the dash panel in some cases.

SUMMARY OF THE INVENTION

The object of the present invention is to enable the protrusions to be inserted to insertion hole portions readily and securely even if the insertion regions of the protrusions to the insertion hole portions cannot be viewed, the protrusions being provided in any one of the dash module and the dash panel at the vehicle body side, and the insertion hole portions being provided in the other, when the dash module is assembled to the vehicle body.

In order to achieve the foregoing object, from the first aspect of the present invention, there is provided an automotive dash module installation structure, comprising: an insertion hole portion provided in any one of a dash module and a dash panel at a vehicle body side, the dash module having various parts assembled thereto with a steering member as a main constituent; a protrusion provided in the other one of said dash module and the dash panel, the protrusion being inserted to said insertion hole portion; a positioning pin provided in any one of at least one end portion of both ends in a vehicle width direction of said steering member and the vehicle body side corresponding thereto, the positioning pin extending in the vehicle width direction; and a guide groove provided in the other one of the end portion of said steering member and the vehicle body side, the guide groove receiving the positioning pin and extending in a fore-and-aft direction of the vehicle body, wherein each length in the fore-and-aft direction of the vehicle body of said protrusion and said guide groove is set in a manner that said guide groove receives said positioning pin before said protrusion starts to be inserted to said insertion hole portion when said dash module is installed to the vehicle body.

In accordance with such a constitution of the automotive dash module installation structure, when the dash module is installed to a dash portion within the vehicle, the positioning pin provided in any one of the steering member and the vehicle body is entered to the guide groove provided in the other thereof, and the dash module is pushed ahead in this state, thus the positioning pin is moved relatively to the guide groove in the fore-and-aft direction of the vehicle body, and is guided thereto. In this guiding process, the protrusion provided in any one of the dash module and the dash panel is inserted to the insertion hole portion provided in the other thereof.

From the second aspect of the present invention, there is provided an automotive dash module installation structure, comprising: an insertion hole portion provided in any one of a dash module and a dash panel at a vehicle body side, the dash module having various parts assembled thereto with a steering member as a main constituent; a protrusion provided in the other one of the dash module and the dash panel, the protrusion being inserted to said insertion hole portion; a temporarily holding claw provided in any one of at least one end portion of both ends in the vehicle width direction of said steering member and the vehicle body side corresponding thereto, the temporarily holding claw extending in a vehicle width direction; and a temporarily holding hole portion provided in the other one of the end portion of said steering member and the vehicle body side, the temporarily holding hole portion receiving the temporarily holding claw and temporarily holding the dash module to the vehicle body, wherein a vicinity of said temporarily holding claw is fastened with a fastener toward a front of the vehicle body.

In accordance with the foregoing constitution, when the dash module is installed to the dash portion within the vehicle, the temporarily holding claw provided in any one of the steering member and the vehicle body is entered in the temporarily holding hole portion provided in the other thereof, and thus the dash module is temporarily held to the vehicle body. Herein, for example in the case where an assist grasping and carrying the dash module is used when the dash module is carried and brought within the vehicle and pushed to a normal installing position of the dash portion, the dash module can be fastened fixedly with the vehicle body by the fastener in a state where the assist is detached from the dash module temporarily held to the vehicle body.

From the third aspect of the present invention, there is provided an automotive dash module installation structure, comprising: an insertion hole portion provided in any one of a dash module and a dash panel at a vehicle body side, the dash module having various parts assembled thereto with a steering member as a main constituent; a protrusion provided in the other one of said dash module and the dash panel, the protrusion being inserted to said insertion hole portion; a positioning pin provided in any one of one end portion of both ends in a vehicle width direction of said steering member and the vehicle body side corresponding thereto, the positioning pin extending in the vehicle width direction; a guide groove provided in the other one of the end portion of said steering member and the vehicle body side, the guide groove receiving the positioning pin and extending in a fore-and-aft direction of the vehicle body; a temporarily holding claw provided in any one of the other end portion of both ends in the vehicle width direction of said steering member and the vehicle body side corresponding thereto, the temporarily holding claw extending in the fore-and-aft direction of the vehicle body; and a temporarily holding hole portion provided in the other one of the other end portion of said steering member and the vehicle body side, the temporarily holding hole portion receiving the temporarily holding claw and temporarily holding the dash module to the vehicle body, wherein each length in the fore-and-aft direction of the vehicle body of said protrusion and said guide groove is set in a manner that said guide groove receives said positioning pin before said protrusion is inserted to said insertion hole portion when said dash module is installed to the vehicle body, and a vicinity of said temporarily holding claw is fastened with a fastener toward a front of the vehicle body.

In accordance with the foregoing constitution, when the dash module is installed to the dash portion within the vehicle, the positioning pin provided in any one of the steering member and the vehicle body is entered to the guide groove provided in the other thereof, and the dash module is pushed ahead in this state, thus the positioning pin is moved relatively to the guide groove in the fore-and-aft direction of the vehicle body, and is guided thereto. In this guiding process, the protrusion provided in any one of the dash module and the dash panel is inserted to the insertion hole portion provided in the other thereof.

Moreover, at this time, the temporarily holding claw provided in any one of the steering member at the other end portion of the steering member and the vehicle body enters the temporarily holding hole portion, and thus the dash module is temporarily held to the vehicle body. Herein, for example in the case where the assist grasping and carrying the dash module is used when the dash module is carried and brought within the vehicle and pushed to the installing position of the dash portion, the dash module can be fastened fixedly with the vehicle body by the fastener in a state where the assist is detached from the dash module temporarily held to the vehicle body.

From the fourth aspect of the present invention, there is provided a method of installing a dash module having various parts assembled therein with a steering member as a main constituent to a dash portion of a vehicle body, said method comprising: guiding a positioning pin provided in any one of one end portion of both ends in a vehicle width direction of said steering member and a vehicle body side corresponding thereto, the positioning pin extending in the vehicle width direction, to a guide groove provided in the other one of the end portion of said steering member and the vehicle body side, the guide groove extending in a fore-and-aft direction of the vehicle body; inserting a temporarily holding claw provided in any one of the other end portion of the both ends in the vehicle width direction of said steering member and the vehicle body side corresponding thereto, the temporarily holding claw extending in the fore-and-aft direction of the vehicle body, to a temporarily holding hole portion provided in the other one of the other end portion of said steering member and the vehicle body side, to temporarily hold said dash module to the vehicle body; and moving said dash module further ahead after said positioning pin is guided to the guide groove and said temporarily holding claw is inserted to the temporarily holding hole portion, thereby inserting a protrusion to a through hole portion formed on a dash panel, the protrusion protruding ahead from a part assembled to said dash module.

In accordance with the foregoing installing method, when the protrusion protruding ahead from the part assembled to the dash module is inserted to the through hole portion of the dash panel, the positioning pin is guided to the guide groove, and the temporarily holding claw is inserted to the temporarily holding hole portion. Accordingly, the protrusion is smoothly inserted to the through hole portion without abutting on the dash panel or scraping a rim of the through hole portion.

DETAILED DESCRIPTION OF THE PREFERRED EMBODIMENT

Hereinbelow, description will be made for an embodiment of the present invention with reference to the drawings.

Figure 1:
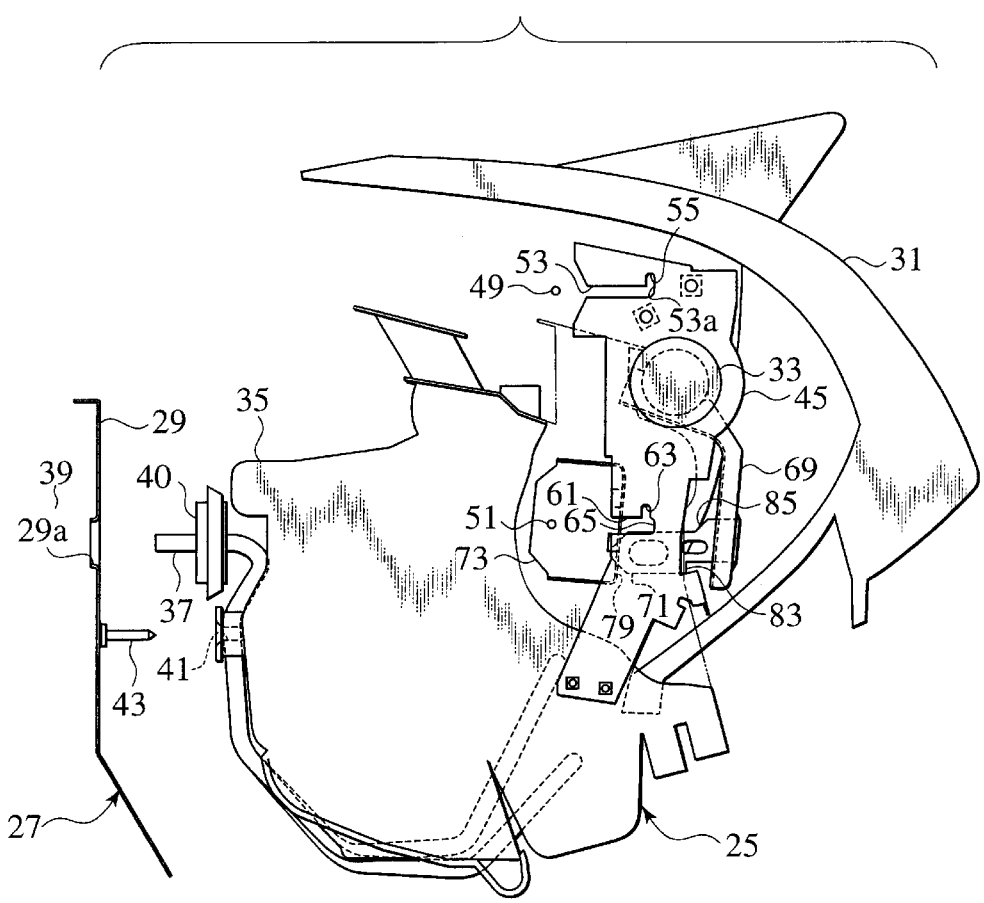
FIG. 1 is a side view of an inside of a vehicle body, showing a state before a dash module according to one embodiment of the present invention is installed to a dash panel of the vehicle body.
Figure 2:
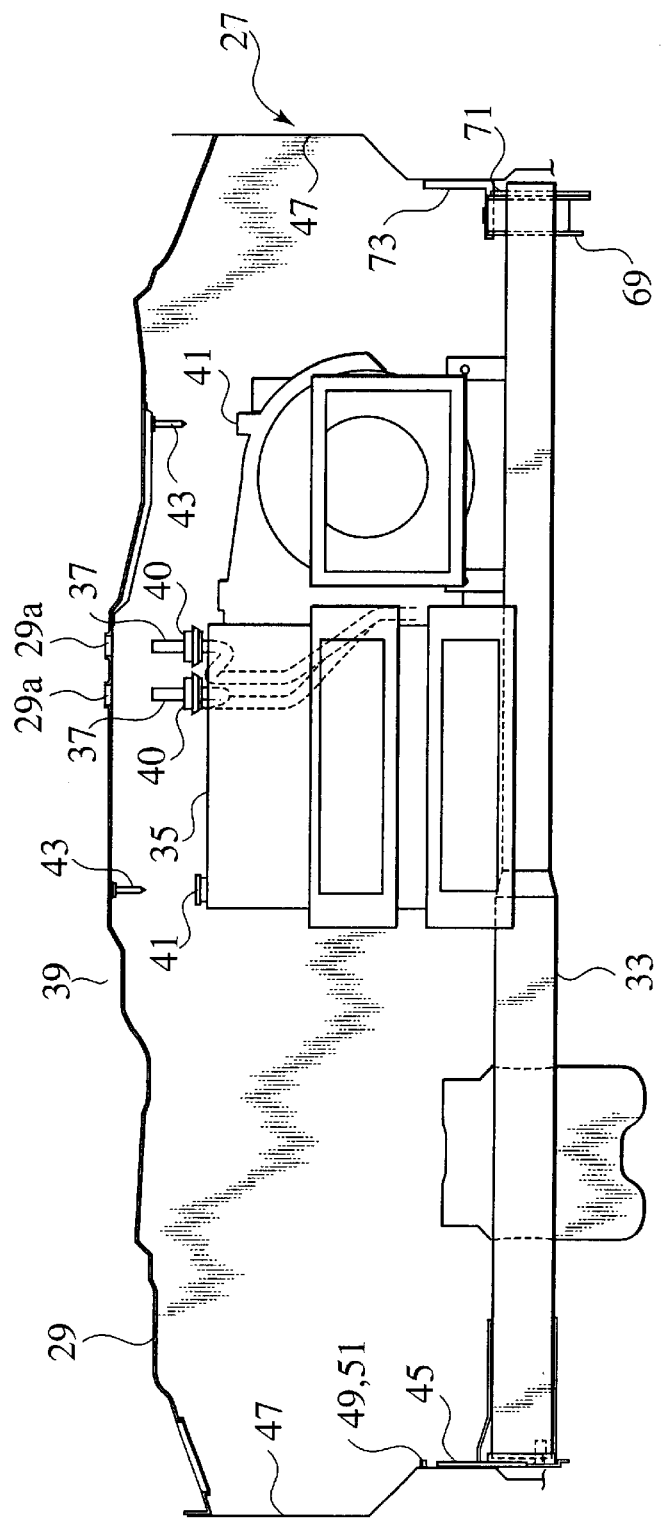
FIG. 2 is a plan view of the inside of the vehicle body, showing a state before the dash module of FIG. 1 is installed to the dash panel of the vehicle body.

FIG. 1 is directed to one embodiment of the present invention, and is a side view of an inside of a vehicle, showing a state before a dash module 25 is installed to a dash panel 29 of a vehicle body 27, and FIG. 2 is a plan view showing the same. Note that an instrument panel 31 is omitted in FIG. 2. This dash module 25 has various parts, that is, the instrument panel 31, an air conditioning unit 35 assembled therein, with a steering member 33 extending in a lateral direction (vehicle width direction) in FIG. 2 as a main constituent. Note that the vehicle herein is specified with a left steering wheel. In other words, a left side of FIG. 2 is a driver's seat side, and a right side thereof is a passenger's seat side.

Heater pipes 37 that are two pipes as protrusions are provided protruding to a dash panel 29 side of the air conditioning unit 35. In a state where the dash module 25 is installed to a normal position of the vehicle body 27, these heater pipes 37 are inserted into through hole portions 29*a* as insertion hole portions formed on the dash panel 29, put in a protruding state to an engine room 39 side, and connected to heater pipes in the engine room 39.

Around the heater pipes 37 on portions of the air conditioning unit 35, which face to the dash panel 29, sealants 40 for sealing the through hole portions 29*a* are attached. This sealant 40 is compressed in a state where the dash module 25 is installed to the normal position of the dash module 25.

Moreover, on positions in the vicinities of both ends of the air conditioning unit 35 in FIG. 2, the positions facing to the dash panel 29, positioning hole portions 41 are formed. In correspondence with these positioning hole portions 41, part positioning pins 43 being inserted to the positioning hole portions 41 are provided on the dash panel 29. Note that the positioning hole portions 41 may be provided on the dash panel 29, and the part positioning pins 43 may be provided on the air conditioning unit 35.

At an end portion of the driver's seat side (left side of FIG. 2) of the steering member 33, a bracket 45 for temporarily holding the driver's seat side of this steering member 33 to the vehicle body 27 side is provided. On an inner surface of an inner panel of a front pillar 47 in the vehicle body 27, the inner surface in front of this bracket 45, two positioning pins 49 and 51 extending in a vehicle width direction are provided protruding and spaced at an appropriate interval in a vertical direction of the vehicle body 27.

Figure 3:
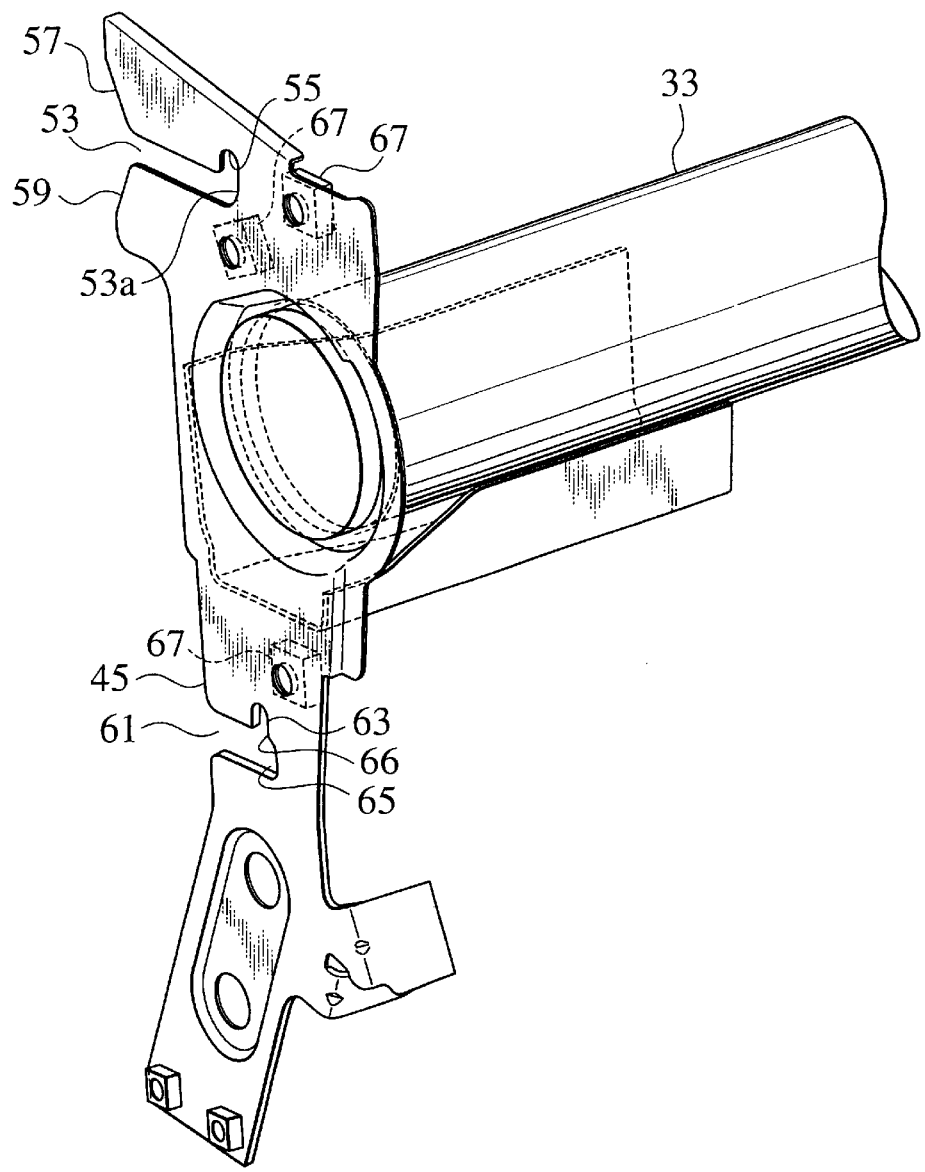
FIG. 3 is a perspective view showing a bracket provided with a guide groove in the dash module of FIG. 1 together with a steering member.

FIG. 3 is a perspective view viewed from the rear of the vehicle body, showing the bracket 45 together with the steering member 33. At the dash panel 29 side of an upper portion of the bracket 45, a guide groove 53 receiving and guiding the lower positioning pin 49 is formed extending to the rear of the vehicle. On an end edge 53*a* of the guide groove 53, a positioning concave portion 55 extending upward is formed. The positioning pin 49 enters this positioning concave portion 55, and thus the dash module 25 is temporarily held, positioned on the vehicle body 27. Moreover, in an entrance portion of the guide groove 53, taper portions 57 and 59 for facilitating the positioning pin 49 to enter the guide groove 53 are formed.

Note that the foregoing positioning concave portion 55 may be formed so as to extend downward to the vehicle body.

A length of the foregoing guide groove 53 in a fore-and-aft direction of the vehicle body is set in order that the positioning pin 49 may enter the guide groove 53 before the heater pipes 37 of the air conditioning unit 35 are inserted onto the through hole portions 29*a* of the dash panel 29. Specifically, when the dash module 25 is installed to the vehicle body 27, the heater pipes 37 are inserted onto the through hole portions 29*a* of the dash panel 29 after the positioning pin 49 starts to enter the guide groove 53.

Moreover, a position of the positioning concave portion 55 in a fore-and-aft direction is set in such a manner that the part positioning pin 43 starts to be inserted onto the positioning hole portion 41 of the air conditioning unit 35 before the positioning pin 49 reaches the positioning concave portion 55.

At the dash panel 29 side of the bracket 45, which is lower than the steering member 33, a guide groove 61 receiving and guiding the lower positioning pin 51 is formed extending to the rear of the vehicle body. The length of this guide groove 61 in the fore-and-aft direction of the vehicle body is also set in order that the positioning pin 51 may enter the guide groove 61 before the heater pipes 37 of the air conditioning unit 35 are inserted into the through hole portions 29*a* of the dash panel 29. However, the length of this guide groove 61 in the fore-and-aft direction of the vehicle body is shorter than that of the upper guide groove 53, hence the positioning pin 51 enters the guide groove 61 after the positioning pin 49 enters the guide groove 53. Moreover, a vertical width dimension of this guide groove 61 is wider than the vertical width dimension of the upper guide groove 53.

A positioning concave portion 63 extending upward in the vicinity of an end edge of the foregoing guide groove 61 is also formed. The positioning pin 51 enters this positioning concave portion 63, and thus the dash module 25 is positioned for the vehicle body 27, and is temporarily held thereat.

In an end edge of the guide groove 61, a horizontal escape portion 65 extending to the rear side of the vehicle body further than the positioning concave portion 63, is formed. This horizontal escape portion 65 may be provided in the end edge 53*a* of the above-described guide groove 53. Between the positioning concave portion 63 and the horizontal escape portion 65, a circular arc portion 66 as a convex curved portion is formed. Note that the foregoing positioning concave portion 63 may be formed so as to extend downward to the vehicle body.

Figure 7:
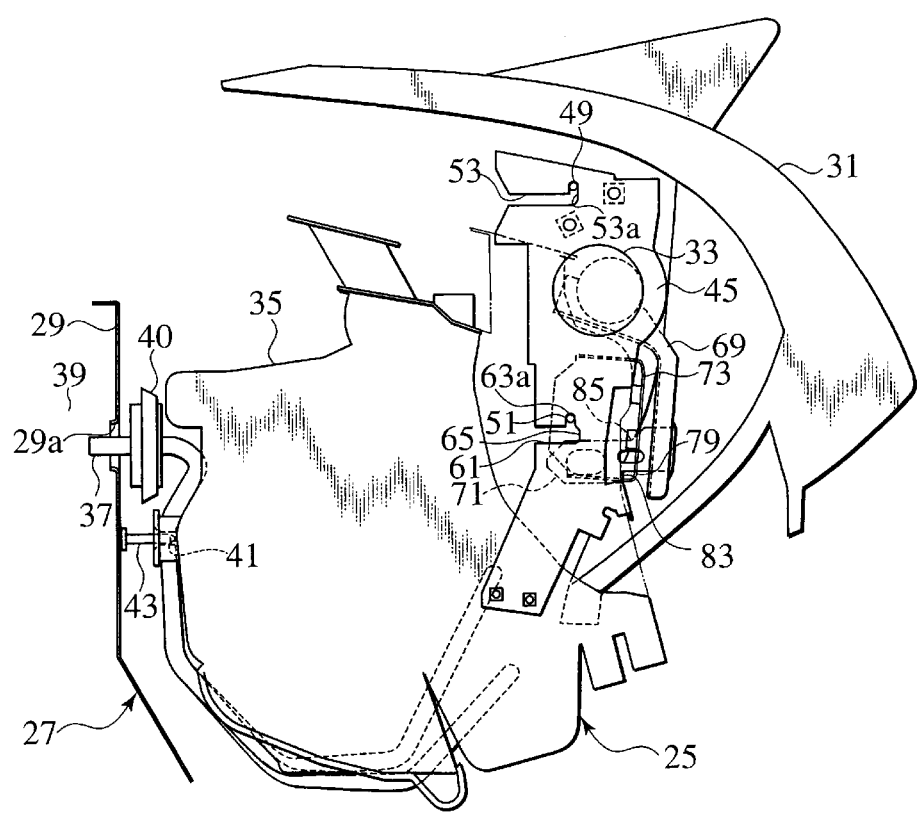
FIG. 7 is an operational explanatory view showing a state where the dash module is temporarily held to the vehicle body.

Moreover, in the positioning concave portion 63, a vertical escape portion 63*a* having room upward is formed in such a manner that a gap may be formed further upward than the position of the positioning pin 51 in a state where the dash module 25 is installed to the normal position of the vehicle body 27 (see FIG. 7 to be described later therewith). Note that, also in the positioning concave portion 55, the vertical escape portion having room upward may be formed similarly.

On upper and lower regions than the steering member 33, which are on the bracket 45 at the steering member 33 side, nuts 67 are mounted in a fixed condition. By fastening bolts (not shown) to these nuts 67 from the left side of the inner panel of the front pillar 47 in FIG. 2, the bracket 45 is fixed to the vehicle body 27.

Figure 4:
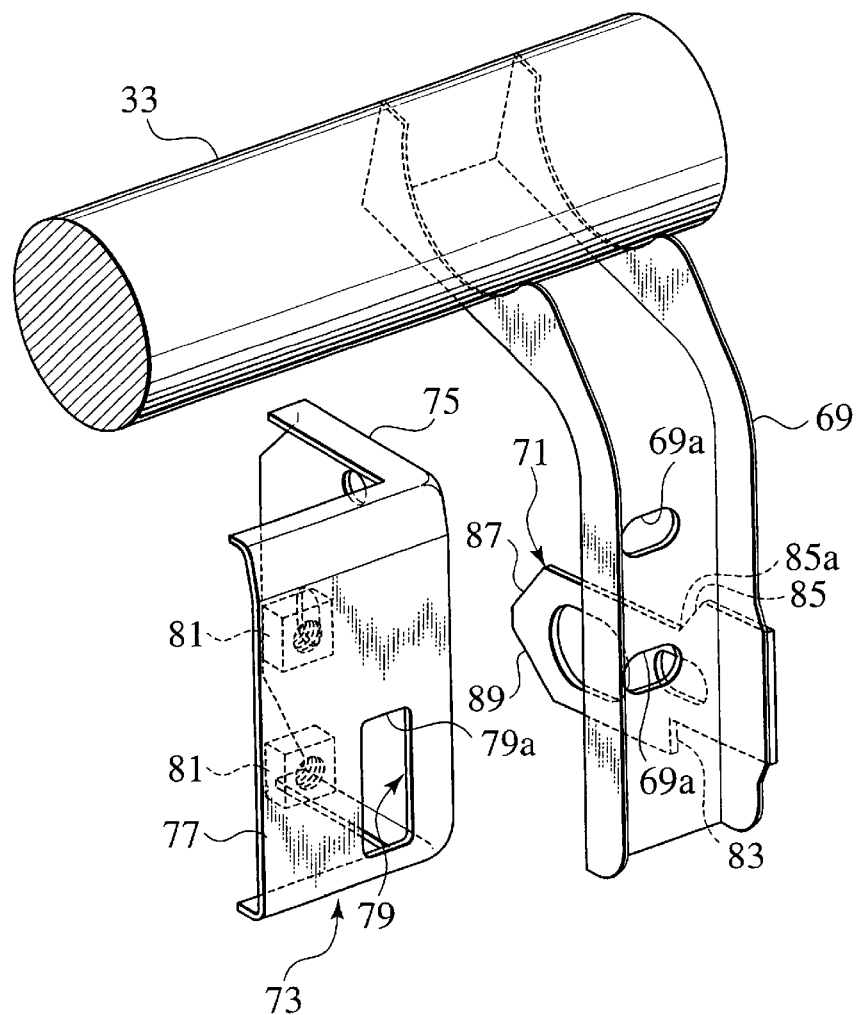
FIG. 4 is a perspective view showing a temporarily holding claw installing bracket provided with a temporarily holding claw of FIG. 1 together with the steering member.

At an end portion of the passenger's seat side of the steering member 33, a temporarily holding claw installing bracket 69 is installed hanging downward therefrom. FIG. 4 is a perspective view viewed from the rear side of the vehicle body, showing the temporarily holding claw installing bracket 69 together with the steering member 33. In the vicinity of a lower end of the temporarily holding claw installing bracket 69, a temporarily holding claw 71 for temporarily holding the passenger's seat side of the steering member 33 on the vehicle body 27 side is provided protruding toward the dash panel 29 side. In correspondence with the temporarily holding claw 71, a member installing bracket 73 is fixed to the inner panel of the front pillar 47 at the vehicle body 27 side.

The member installing bracket 73 has a fixed portion 75 to be fixed to the front pillar 47 and a temporarily holding portion 77 formed at a right angle to the fixed portion 75. In this temporarily holding portion 77, a temporarily holding hole portion 79 in a rectangular shape long in the vertical direction, to which the temporarily holding claw 71 is inserted, is formed, and nuts 81 for fixing the temporarily holding claw installing bracket 69 to the temporarily holding portion 77 by bolts as fasteners (not shown) are mounted in the fixed condition.

In the temporarily holding claw 71, a step portion 83 for the temporary holding is formed in a lower portion thereof, to the slightly rear side of the vehicle body from a center thereof in the fore-and-aft direction of the vehicle body. The steering member 33 is temporarily held to the vehicle body 27 side in a state where the temporarily holding claw 71 is inserted to the temporarily holding hole portion 79 and this step portion 83 enters more ahead than the temporarily holding portion 77.

In an upper portion of the temporarily holding claw 71, to the slightly rear side of the vehicle body from the center thereof in the fore-and-aft direction of the vehicle body, a taper guide portion 85 is formed. A standing portion 85a of this guide portion 85 is located more to the temporarily holding claw installing bracket 69 side than the step portion 83. Specifically, first, the step portion 83 enters more ahead than the temporarily holding portion 77 through the temporarily holding hole portion 79, and then the temporarily holding claw 71 moves downward relative to the temporarily holding claw installing bracket 69. And thereafter, the temporarily holding claw 71 moves further ahead. In this case, the guide portion 85 abuts on an upper edge 79a of the temporarily holding hole portion 79, and thereafter, is guided sliding on the upper edge 79a.

The respective dimensions in the vertical direction of a tip side and a base side of the temporarily holding claw 71 with the step portion 83 and the guide portion 85 as boundaries are set approximately equal to a dimension in the vertical direction of the temporarily holding claw 79 or slightly smaller. At the tip portion of the temporarily holding claw 71, taper surfaces 87 and 89 are formed so as to facilitate the insertion of the temporarily holding claw 71 to the temporarily holding hole portion 79.

The length of the foregoing temporarily holding claw 71 in the fore-and-aft direction of the vehicle body is set in order that the rearer side than the tip taper surfaces 87 and 89 of the temporarily holding claw 71 may enter the temporarily holding hole portion 79 before the heater pipes 37 of the air conditioning unit 35 start to be inserted to the through hole portions 29a of the dash panel 29. Specifically, when the dash module 25 is installed to the vehicle body 27, the heater pipes 37 are inserted to the through hole portions 29a of the dash panel 29 after the rearer side than the tip taper surfaces 87 and 89 of the temporarily holding claw 71 starts to enter the temporarily holding hole portion 79.

Moreover, in a state immediately after the step portion 83 of the temporarily holding claw 71 enters more ahead than the temporarily holding portion 77, the sealant 40 shown in FIG. 1 is uncompressed.

Next, description will be made for a method of installing the dash module 25 to the vehicle body 27. First, the dash module 25 is brought in the inside of the vehicle, grasped by an assist (not shown) from the rear side of the vehicle body, and is located in front of the dash panel 29 (rear side of the vehicle body). From this state, the dash module 25 is gradually moved to the front of the vehicle body. Then, firstly, the tip of the temporarily holding claw 71 at the passenger's seat side starts to enter the temporarily holding hole portion 79 at the vehicle body 27 side as shown in FIG. 1.

Figure 5:
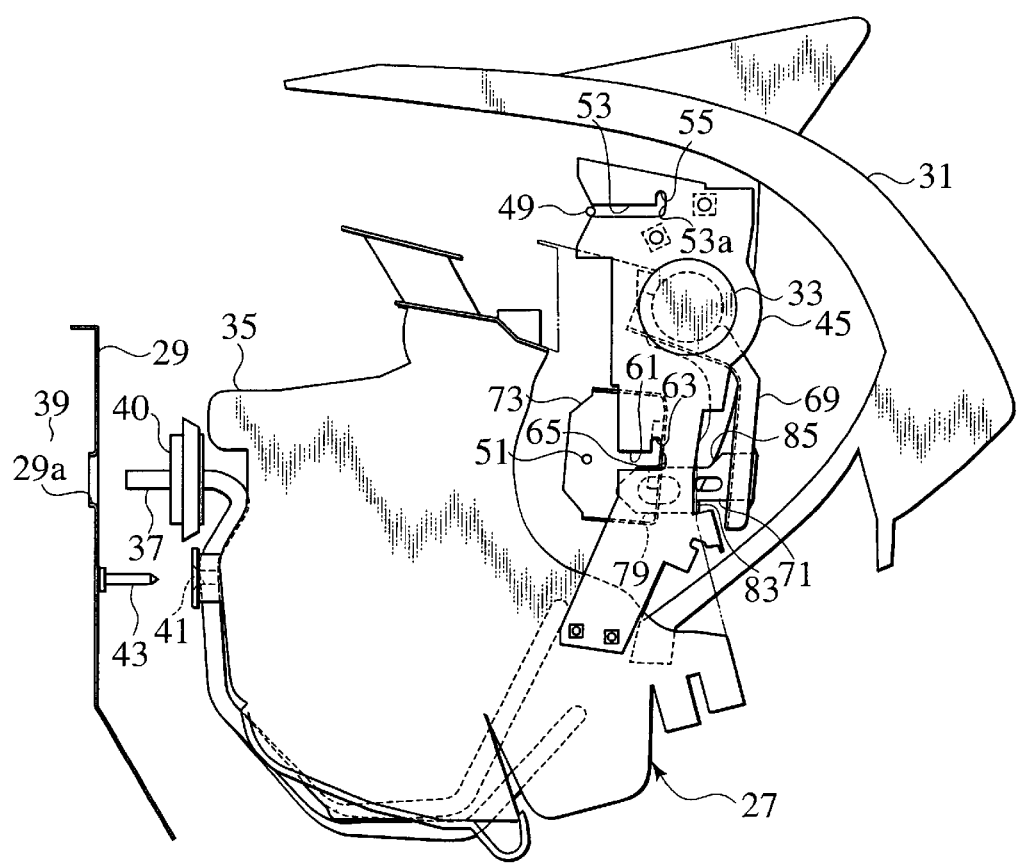
FIG. 5 is an operational explanatory view showing a state where a tip of the temporarily holding claw at a passenger's seat side starts to enter a temporarily holding hole portion at a vehicle body side.
Figure 6:
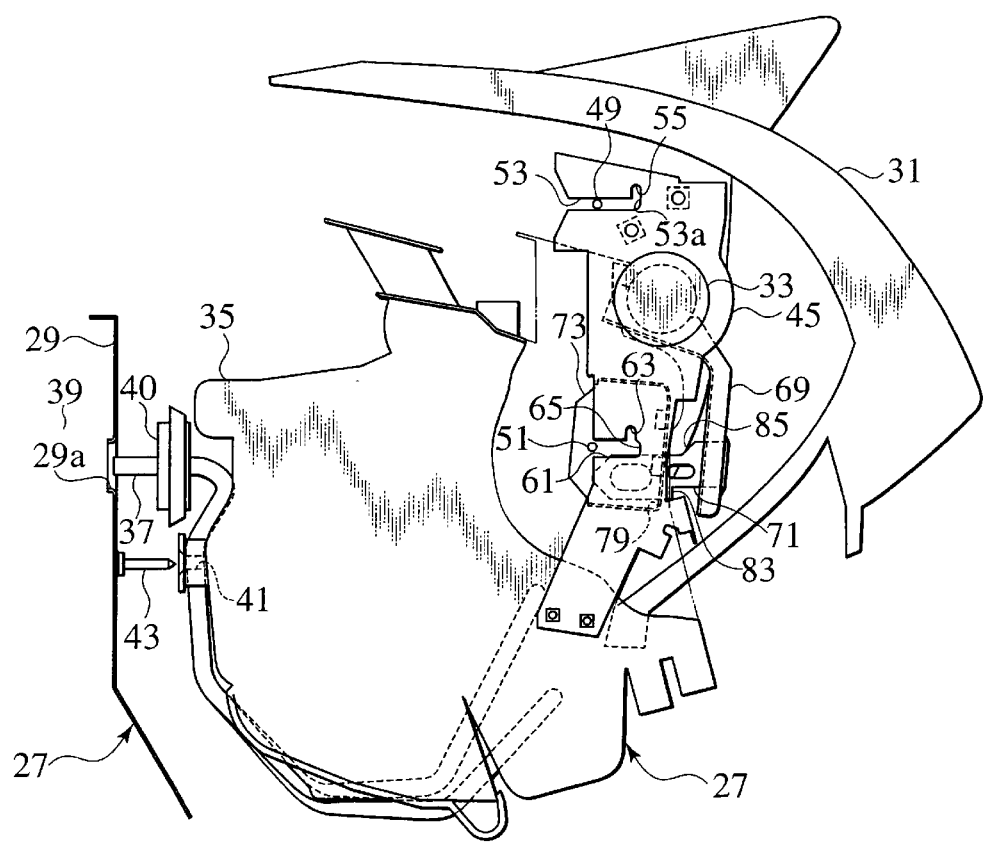
FIG. 6 is an operational explanatory view showing a state where heater pipes of an air conditioning unit start to be inserted to through hole portions of the dash panel.

When the dash module 25 is moved further ahead, as shown in FIG. 5, the guide groove 53 in the upper side of the driver's seat starts to receive the positioning pin 49 at the vehicle body 27 side, which corresponds to the guide groove 53, while the temporarily holding claw 71 being guided by the temporarily holding hole portion 79. Thereafter, by moving the dash module 25 further ahead, the heater pipes 37 start to be inserted to the through hole portions 29a of the dash panel 29 as shown in FIG. 6 after the lower guide groove 61 starts to receive the positioning pin 51 corresponding thereto.

As described above, when the heater pipes 37 start to be inserted to the through hole portions 29a, the positioning pins 49 and 51 already enter the guide grooves 53 and 61 and are guided, respectively. Accordingly, as the temporarily claw 71 is guided and inserted temporarily holding hole portion 79, even if insertion regions of the heater pipes 37 to the through hole portions 29a cannot be directly viewed, the heater pipes 37 do not abut on the dash panel 29 or scrape rims of the through hole portions 29a, thus an inserting work thereof to the through hole portions 29a can be performed readily and surely.

When the dash module 25 is further moved to the front of the vehicle body, the heater pipes 37 are moved forward to the through hole portions 29a, the part positioning pin 43 at the dash panel 29 side starts to enter the positioning pin 41 of the air conditioning unit 35. Thereafter, when the dash module 25 is moved more ahead, first, the upper positioning pin 49 reaches the end edge 53a of the guide groove 53. Then, the lower positioning pin 51 reaches the end edge of the guide groove 61, and at approximately the same time as the above, the step portion 83 of the temporarily holding claw 71 enters the temporarily holding hole portion 79. Thereby, as shown in FIG. 7, in the steering member 33, the positioning pins 49 and 51 respectively enter the positioning concave portions 55 and 63 to move downward the bracket 45 and the temporarily holding claw 71. As a whole, the rear side of the vehicle body of the dash module 25 is moved downward relative to the vehicle body 27 and is temporarily held.

At the time when the rear side of the vehicle body of the dash module 25 is moved downward relative to the vehicle body 27, the part positioning pin 43 at the dash panel 29 side already enters the positioning hole portion 41 of the air conditioning unit 35. Accordingly, at this time, a front-end side of the air conditioning unit 35 hardly moves downward, and the tips of the heater pipes 37 are not shifted from the through hole portions 29a of the dash panel 29.

When the temporarily holding claw 71 is temporarily held in the temporarily holding hole portion 79 (state of FIG. 7), the end portion at the passenger's seat side of the steering member 33, in which the temporarily holding claw 71 is provided, is located at the rear side of the vehicle body relative to the normal installing position in the fore-and-aft direction of the vehicle body to the vehicle body 27. And on the other hand, the driver's seat side of the steering member 33 is located at the normal position in the fore-and-aft direction of the vehicle body. Accordingly, at this point of time, the steering member 33 (dash module 25) is tilted in such a manner that the right passenger's seat side in FIG. 2 is at the rearer side of the vehicle body than the left driver's seat side.

Figure 8:
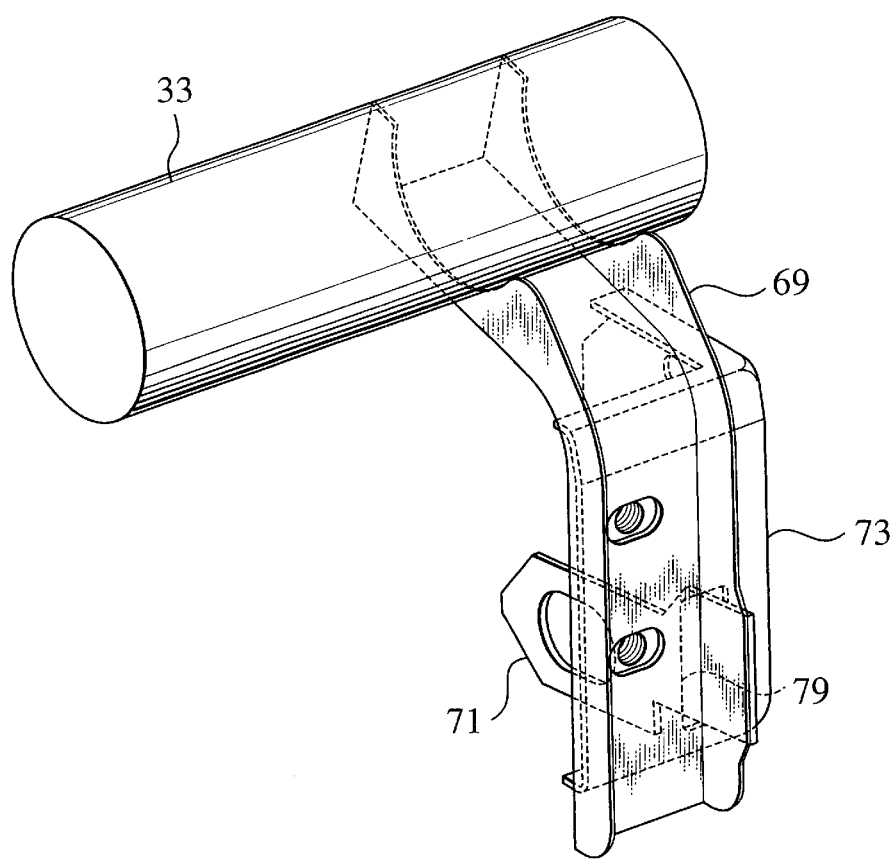
FIG. 8 is a perspective view showing a state where the temporarily holding claw installing bracket is fixed to a member installing bracket at the vehicle body side.
Figure 9:
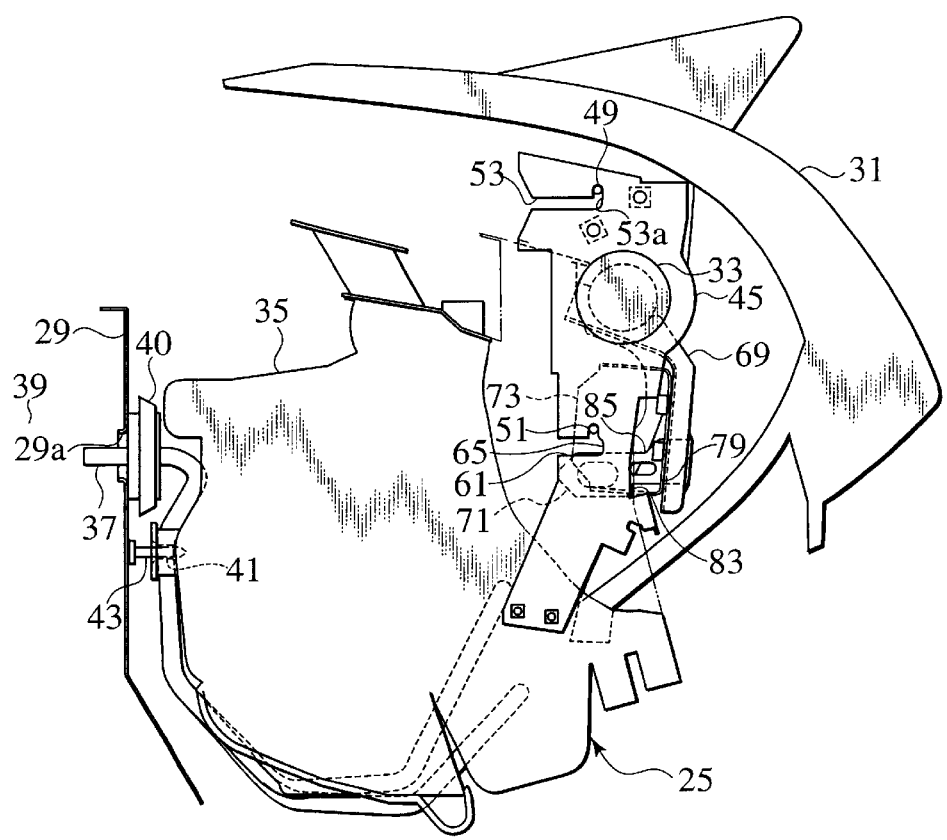
FIG. 9 is an operational explanatory view showing a state where an installation of the dash module to the vehicle body is completed.
Figure 10:
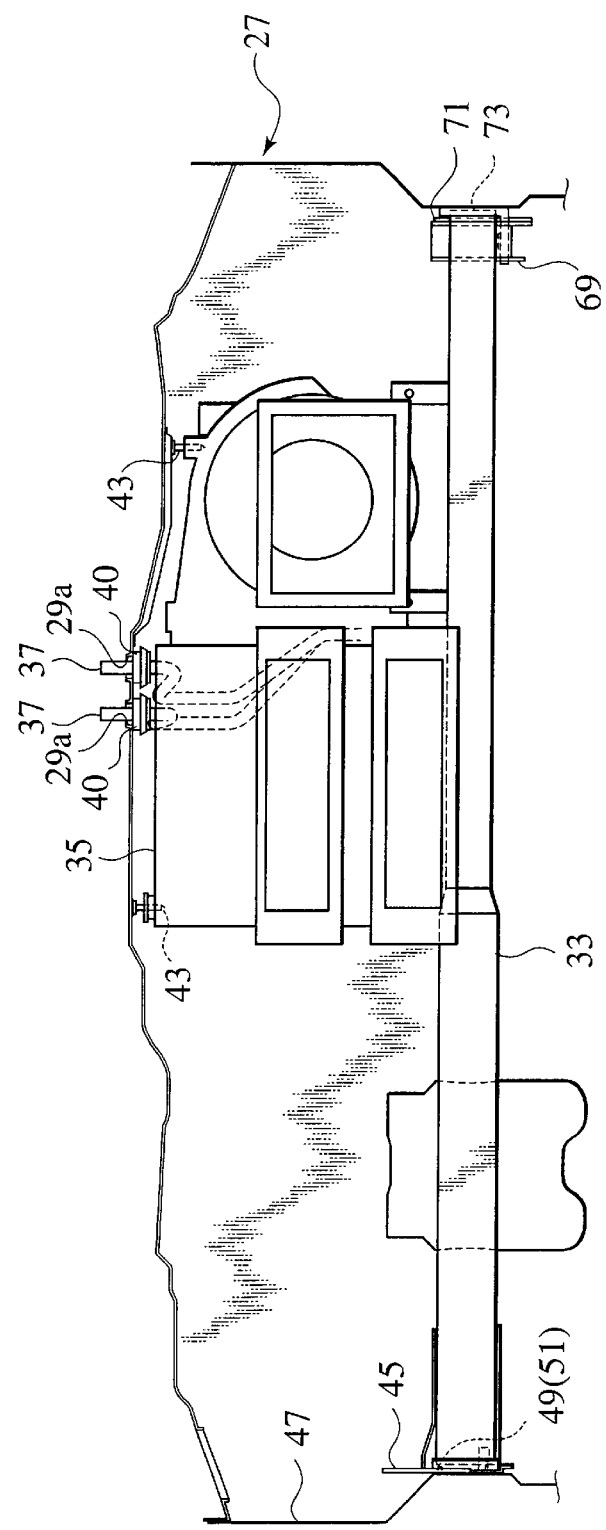
FIG. 10 is a plan view showing a state where the installation of the dash module to the vehicle body is completed.

From this state, the bolts (not shown) are inserted to bolt inserting hole portions 69*a* of the temporarily holding claw installing bracket 69 in FIG. 4, and are fastened with the nuts 81 of the member installing bracket 73. Thereby, while the sealant 40 being gradually compressed, the temporarily holding claw installing bracket 69 is moved ahead together with the steering member 33. FIG. 8 shows a state after these bolts are fastened therewith. Furthermore, also at the driver's seat side, bolts (not shown) are fastened with the nuts 67 of the bracket 45. Thereby, an installation completion state shown in FIGS. 9 and 10 is brought.

When the temporarily holding claw installing bracket 69 is fastened to the member installing bracket 73 by the bolts, the temporarily holding claw 71 is inserted to the temporarily holding hole portion 79, the positioning pins 49 and 51 enter the positioning concave portions 55 and 63, and thus the dash module 25 is temporarily held on the vehicle body 27. Accordingly, the grasp of the dash module 25 by the assist can be released, resulting in the movement of the assist to the outside of the vehicle. Thereby, the fastening work can be performed in a wide space and is facilitated.

Moreover, the temporarily holding claw 71 in a temporarily held state is hung on the temporarily holding hole portion 79 by the step portion 83. Accordingly, during the fastening work, it is not necessary to press the dash module 25 ahead against a reaction force of the compressed sealant 40, thus facilitating the fastening work.

The lower guide groove 61 in the driver's seat side bracket 45 has the horizontal escape portion 65 formed at the end edge thereof. Therefore, even if unevenness exists in the positions in the fore-and-aft direction of the vehicle body of the positioning pins 49 and 51, the positioning pin 51 enters the horizontal escape portion 65, thereby absorbing the unevenness. Moreover, to the amount of the entrance of the positioning pin 51 to the horizontal escape portion 65, the dash module 25 can be moved more in the fore-and-aft direction of the vehicle body, and thus the positioning pins 49 and 51 can be made to securely enter the positioning concave portions 55 and 63. The positioning pin 51, which has entered the horizontal escape portion 65, smoothly enters the positioning concave portion 63 along the circular arc portion 66, thus securing the transition to the temporarily held state.

Moreover, in the positioning concave portion 63 of the lower guide groove 61, the vertical escape portion 63*a* having room upward (see FIG. 7) is formed in such a manner that the gap may be formed further upward than the position of the positioning pin 51 in a state where the dash module 25 is installed to the normal position of the vehicle body 27. Accordingly, even if the unevenness exists in the positions in the fore-and-aft direction of the vehicle body of the positioning pins 49 and 51, the positioning pin 51 enters the vertical escape portion 63*a*, thereby absorbing the unevenness, and thus the positioning pins 49 and 51 can be made to securely enter the positioning concave portions 55 and 63.

Furthermore, since the guide groove 53 is formed to be long in the fore-and-aft direction of the vehicle body, the region receiving the positioning pin 49 is located more to the front side of the vehicle body and can be readily viewed by a worker, thus securing the inserting work of the positioning pin 49 to the guide groove 53.

Figure 11:
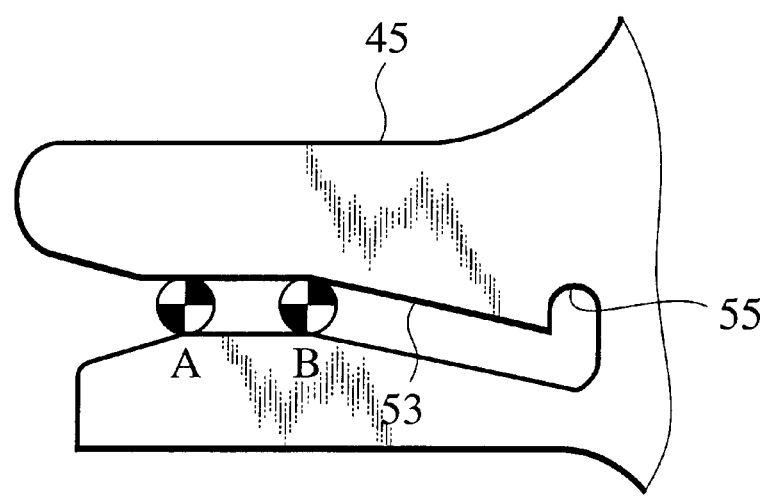
FIG. 11 is an explanatory view showing a positional relation between a driver's seat side bracket and positioning pins for use in a vehicle body having two dash panels provided in a fore-and-aft direction of the vehicle body, the two dash panels being spaced by a specified gap.

In the above-described embodiment, description has been made for the case where the dash panel 29 is one piece. However, the present invention can be applied to a vehicle body having two pieces of dash panels to increase a shutoff of sound in a vehicle cabin. FIG. 11 shows a main portion of the driver's seat side bracket 45 for use in the vehicle body having the two dash panels provided in the fore-and-aft direction of the vehicle body, the two dash panels being spaced by a gap, for example, of about 30 mm. With regard to the guide groove 53 of this bracket 45, a reference code A denotes a position of the positioning pin 49 when the heater pipes 37 are inserted to through hole portions of the first dash panel, and a reference code B denotes a position of the positioning pin 49 when the heater pipes 37 are inserted to through hole portions of the second dash panel.

Note that the positioning pins 49 and 51 and the temporarily holding hole portion 79 at the vehicle body 27 side may be provided at the steering member 33 side, and the guide grooves 53 and 61 and the temporarily holding claw 71 at the steering member 33 side may be provided at the vehicle body 27 side, respectively.

Moreover, the installing structure by the positioning pins 49 and 51 and the guide grooves 53 and 61 at the driver's seat side may be provided at the passenger's seat side, and the installing structure by the temporarily holding claw 71 and the temporarily holding hole portion 79 at the passenger's seat side may be provided at the driver's seat side.

Furthermore, the part provided with the protrusion penetrating the dash panel 29 is not limited to the air conditioning unit 35. Moreover, a constitution may be adopted, in which the protrusion is provided at the dash panel 29 side, and a through hole portion having this protrusion inserted thereto is provided at the dash module 25 side as the insertion hole portion, that is, in the part assembled to the dash module 25.

Figure 12:
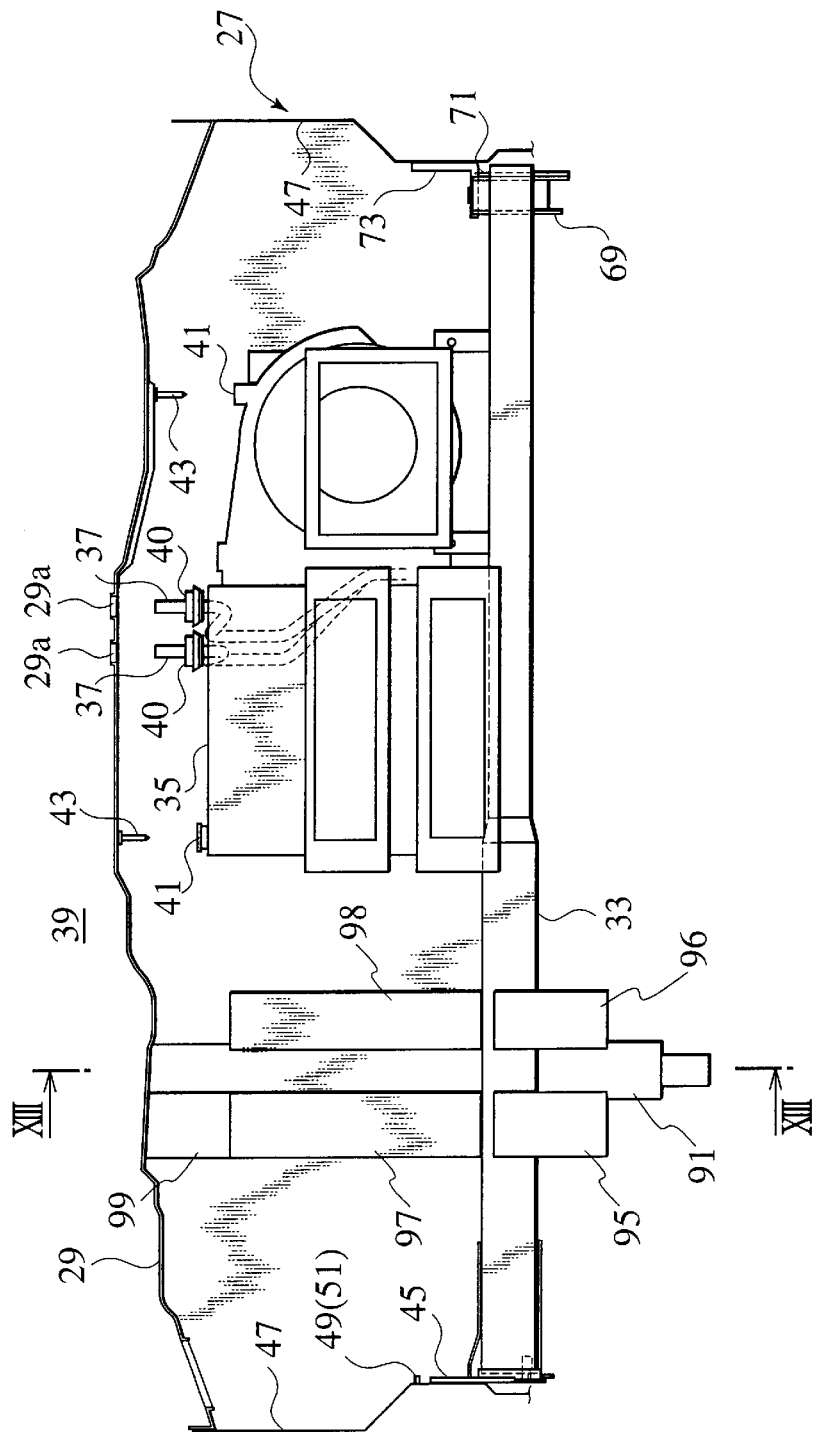
FIG. 12 is a plan view according to another embodiment of the present invention, corresponding to FIG. 2.
Figure 13:
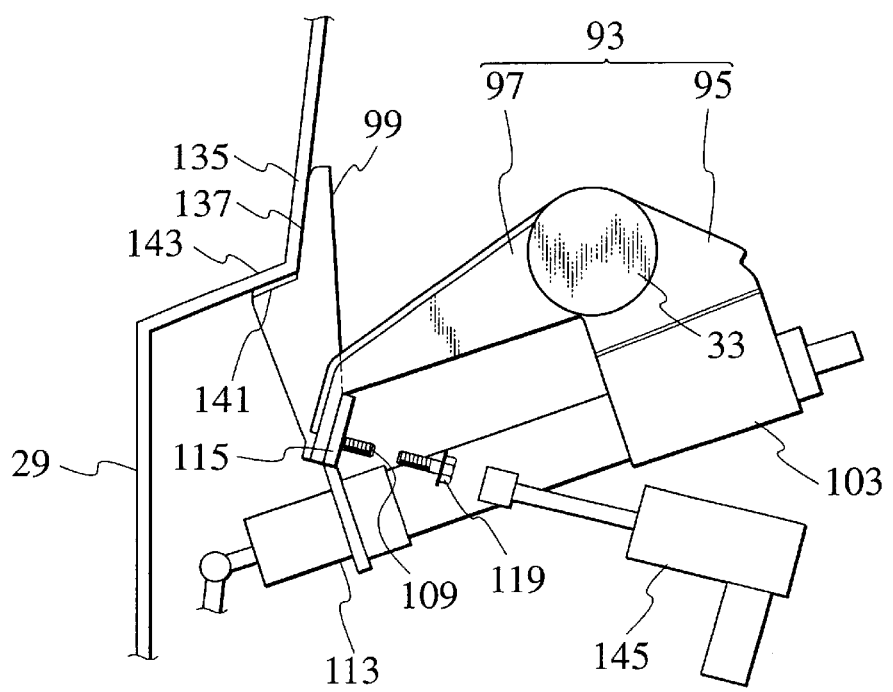
FIG. 13 is a sectional view of FIG. 12, taken along a line XIII-XIII.

FIGS. 12 to 17B are views according to another embodiment of the present invention. FIG. 12 is a plan view corresponding to FIG. 2 described above. FIG. 13 is a sectional view of FIG. 12, taken along a line XIII-XIII. In this embodiment, a structure is adopted, in which a steering column 91 that has been omitted in FIG. 2 described above as the part to be installed to the dash module 25 is fixed to the dash panel 29.

The steering column 91 is supported by a steering column mount bracket 93 (upper mount brackets 95 and 96 and lower mount brackets 97 and 98) fixed to the steering member 33 by welding and the like, and the lower portion of the steering column mount bracket 93 is fixed to the lower portion of the support bracket 99 installed to the dash panel 29.

Figure 14:
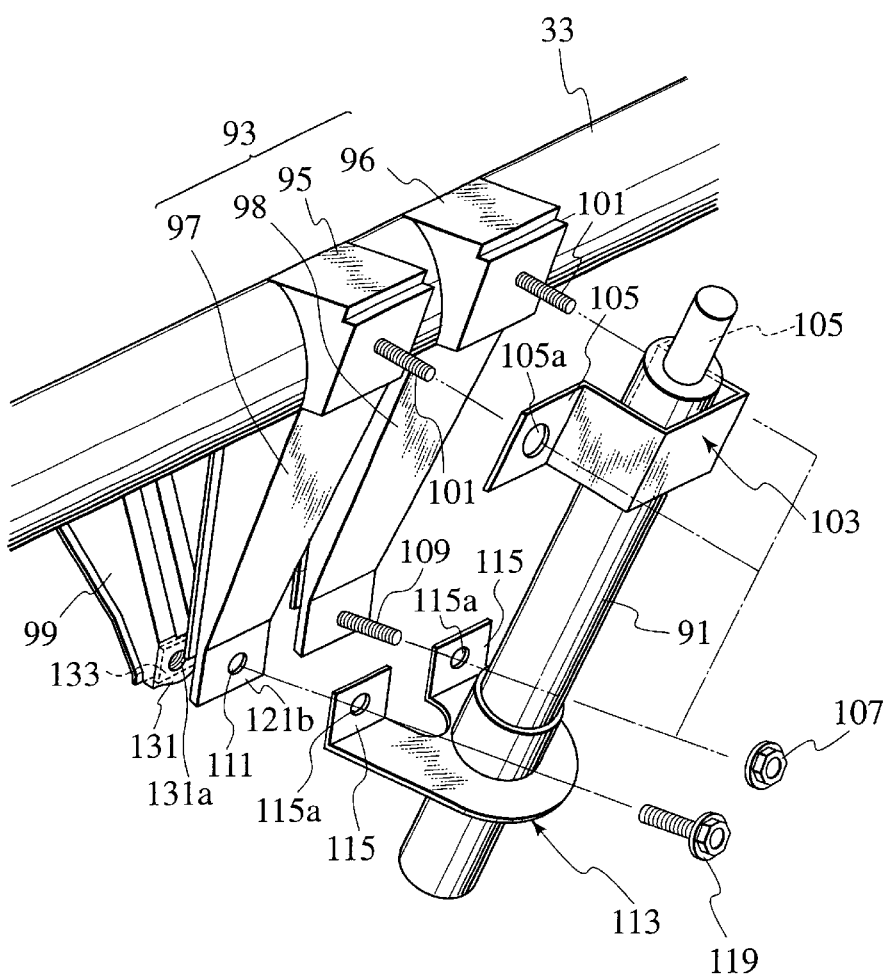
FIG. 14 is an exploded perspective view of the steering member and a steering column in the embodiment of FIG. 12.

As shown in the exploded perspective view of FIG. 14, two upper mount brackets 95 and 96 of the steering column mount bracket 93 are provided along the longitudinal direction of the steering member 33, and are equipped with bolts 101 protruding to the rear side of the vehicle body. Meanwhile, an upper bracket 103 is fixed to the upper portion of the steering column 91. The above-described bolts 101 are inserted to installation holes 105*a* drilled in flanges 105 of the upper bracket 103, and fastened with the nuts 107.

Two lower mount brackets 97 and 98 of the steering column mount bracket 93 are also provided along the longitudinal direction of the steering member 33. A bolt 109 is provided in the lower mount bracket 98, one of the two lower mount brackets, so as to protrude to the rear side of the vehicle body, similar to the upper mount brackets 95 and 96. A bolt insertion hole 111 is drilled in the other lower mount bracket 97.

Meanwhile, a lower bracket 113 is fixed to the lower portion of the steering column 91. Installation holes 115a are drilled in right-and-left installation flanges 115 of the lower bracket 113 respectively. The bolt 109 of the lower mount bracket 98, one of the two lower mount brackets described above, is inserted to the installation hole 115a located on the right side as shown in FIG. 14, and fastened with a nut 107.

The upper bracket 103 and the lower bracket 113 are fastened at three spots to the above-described two upper mount brackets 95 and 96 and one lower mount bracket 98 by the nuts 107. Thus, the steering column 91 is fixed and held to the steering member 33 to be integrated therewith, whereby a state is brought, where the steering column 91 is incorporated into the dash module.

Figure 15:
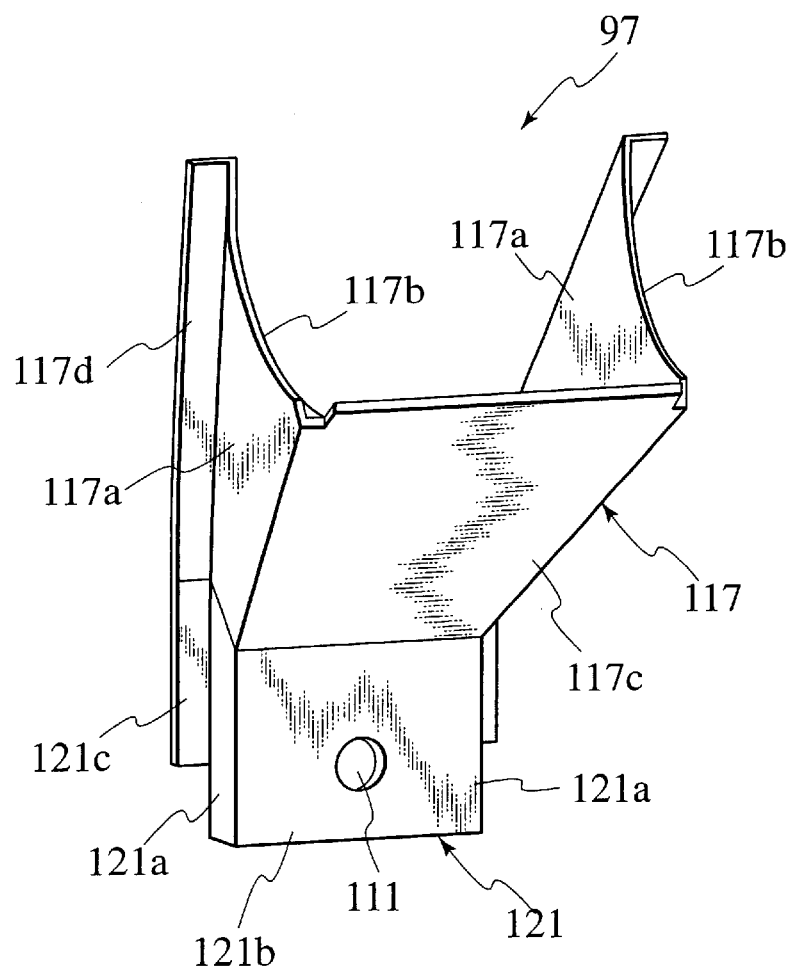
FIG. 15 is a perspective view of a lower mount bracket in a steering column mount bracket of the embodiment of FIG. 12.

FIG. 15 is a perspective view showing the other lower mount bracket 97 having the bolt insertion hole 111 for the steering column mount bracket 93. This lower mount bracket 97 includes: a main body 117 with its upper portion fixed to the steering member 33 by welding; and a fixed portion 121 integrated with the lower portion of the main body 117 and fixed to the support bracket 99 by a bolt 119 shown in FIG. 14.

In the main body 117, upper ends of right-and-left side plates 117a are formed as concave arc portions 117b so as to match the circular outer peripheral surface of the steering member 33. Edge portions of the right-and-left side plates 117a at the rear side of the vehicle body are coupled to each other by a coupling plate 117c. The fixed portion 121 couples fixed portion side plates 121a, each forming the same surface as the above-described side plate 117a. And, the fixed portion 121 has a fixed portion coupling plate 121b, which is bent so that a portion thereof at the rear side of the vehicle body (part of FIG. 15 appearing closer to the viewer) can be a concave portion with respect to the coupling plate 117c, and abuts on the support bracket 99.

Moreover, flanges 117d are formed on edge portions of the side plates 117a of the main body 117, which are located at the opposite side from the coupling plate 117c. And, flanges 121c are formed on edge portions of the fixed portion side plates 121a of the fixed portion 121, which are opposite with the fixed portion coupling plate 121b. Both flanges 117d and 121c are bent so that portions thereof at the rear side of the vehicle body (part of FIG. 15 appearing closer to the viewer) can be concave portions.

One lower mount bracket 98 of the steering column mount bracket 93 is different from the lower mount bracket 97 only in that it includes the bolt 109 in place of the above-described bolt insertion hole 111 of the other lower mount bracket 97, and is the same in shape as the other portions.

Figure 16:
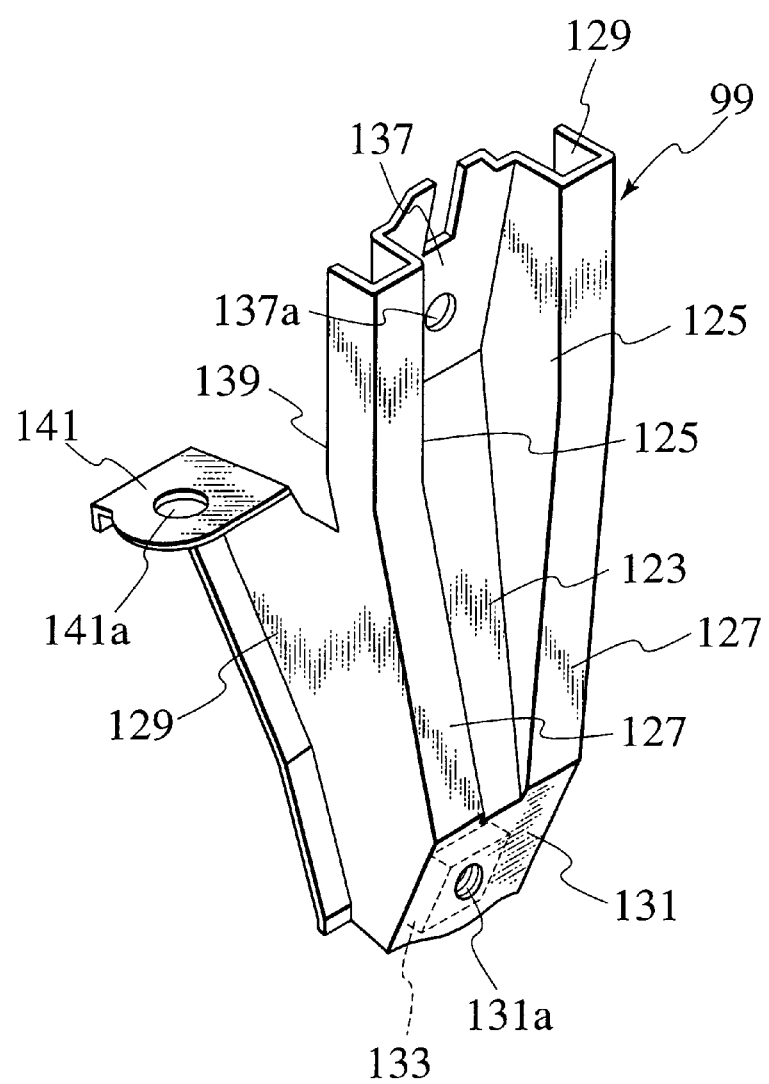
FIG. 16 is a perspective view of a support bracket in the embodiment of FIG. 12.

FIG. 16 is a perspective view of the support bracket 99. The support bracket 99 includes: a central main surface 123; right-and-left inner side surfaces 125 rising perpendicularly from the central main surface 123; right-and-left front face portions 127 perpendicularly bent to the sideways from the inner side surfaces 125; and outer side surfaces 129 bent from the front face portions 127 and parallel to the above-described inner side surfaces 125. In a lower end portion of the support bracket 99, a fixed surface 131 to which a fixed portion coupling plate 121b of the above-described lower mount bracket 97 makes a surface contact is formed. A bolt insertion hole 131a to which the bolt 119 shown in FIG. 14 described above is inserted is drilled in the fixed surface 131. On a backside thereof, a welded nut 133 to which the bolt 119 is fastened is provided.

Moreover, the above-described fixed surface 131 is formed so that a portion thereof can be convex with respect to the front face portions 127 in a state where the support bracket 99 is installed to the dash panel 29, and is in a state in which it is inclined so as to face downward to the rear side of the vehicle body.

On the upper end of the central main surface 123, an installed surface 137 that is bent so that a portion thereof at the rear side of the vehicle body can be concave with respect to the central main surface 123, and that abuts on the upper fixed portion 135 of the dash panel 29 shown in FIG. 13 is continuously formed. On this installed surface, a bolt insertion hole 137a for fastening the installed surface 137 to the upper fixed portion 135 is drilled.

The outer side surface 129 has a notch portion 139 on the upper portion thereof. On the upper edge of the notch portion 139, an installed portion 141 to be bent outward, perpendicularly to the outer side surface 129 is provided. As shown in FIG. 13, the installed surface 141 abuts on, and is fixed to, the lower fixed portion 143 bent diagonally downward to the front side of the vehicle body with respect to the above-described upper fixed portion 135 of the dash panel 29. On the installed portion 141, a bolt insertion hole 141a for fastening a bolt therethrough is drilled in.

With regard to the respective bolts fastened to the installed surfaces 137 and 141 to the dash panel 29 (upper fixed portion 135 and lower fixed portion 143), stud bolts may be provided on the dash panel 29 in advance, to which nuts are fastened. Alternatively, welded nuts may be provided on the dash panel 29, to which bolts are fastened.

Next, description will be made for the installation method of the dash module 25 to the vehicle body 27 according to another embodiment described above. Here, the dash module 25 is installed to the dash portion of the vehicle body 27, similarly to the embodiment of FIG. 1, in a state where the steering column 91 is fixed and installed to the steering column mount bracket 93 on the steering member 33 side via the upper and lower brackets 103 and 113 by three nuts 107.

Figure 17A:
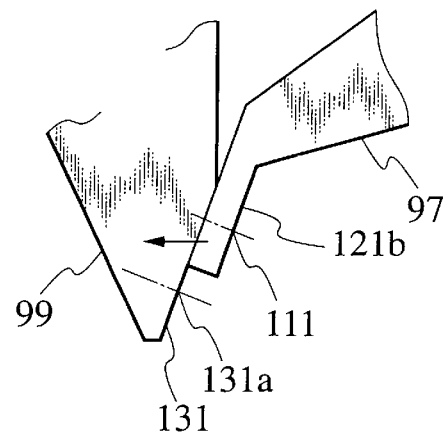
FIGS. 17A and 17B are operational explanatory views showing moving tracks of the steering mount bracket and the support bracket when the dash module is installed to the vehicle body in the embodiment of FIG. 12.

In the process of this installation operation, for example, when the positioning pin 49 is located at the reference code D for the guide groove 53 of the bracket 45 shown in FIG. 11, that is, in a state immediately before the positioning pin 49 enters the positioning concave portion 55, the fixed portion coupling plate 121b of the lower mount bracket 97 abuts on the fixed surface 131 of the support bracket 99. At the time when the fixed portion coupling plate 121b starts to abut on the fixed surface 131, as shown in FIG. 17A, the lower mount bracket 97 is located more above than the normal fixed portion with respect to the support bracket 99, and the bolt insertion hole 111 is not matched to the bolt insertion hole 131a of the support bracket 99 and is put into a state where it is shifted therefrom.

Figure 17B:
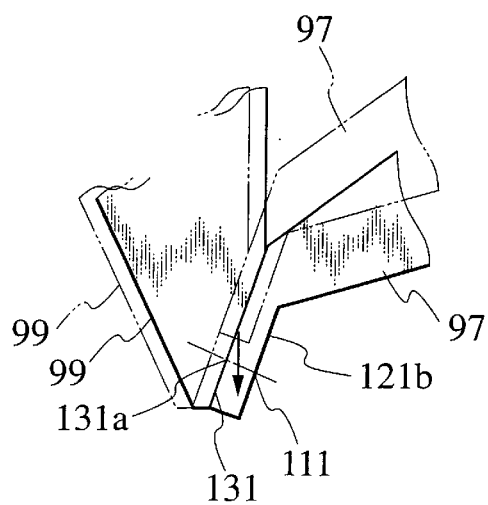

When the dash module 25 is further pushed into the front side of the vehicle body in this state, accompanied with this, the lower mount bracket 97 is moved to the chain double-dashed line position of FIG. 17B up to the front side of the vehicle body. Due to this movement, the support bracket 99 is pushed toward the front of the vehicle body, and thus the support bracket 99 is bent so as to be located at the chain double-dashed line position. Thereafter, nearly at the same time as the positioning pin 49 enters the positioning concave portion 55 shown in FIG. 11, the entire dash module 25 is moved downward. Accompanied with this movement, the lower mount bracket 97 is moved downward from the chain double-dashed line position to the solid line as shown in FIG. 17B.

In a state where the lower mount bracket 97 is located at the solid line position in FIG. 17B, the support bracket 99 recovers from the above-described bent state to substantially return to the position shown by the solid line. This is a state where the fixed surface 121b of the lower mount bracket 97 properly abuts on the fixed surface 131 of the support bracket 99, and where the bolt insertion hole 111 of the lower mount bracket 97 and the bolt insertion hole 131a of the support bracket 99 are matched to each other.

As described above, when the dash module 25 is installed to the dash portion of the vehicle body 27, even if the track is made in the downward direction after the dash module 25 is moved to the front side of the vehicle body, the support bracket 99 is pushed and slightly bent by the lower mount bracket 97, and thereafter is restored from the bent state. Therefore, the installation operation can be securely performed.

In a state where the lower mount bracket 97 is located at the solid line position in FIG. 17B, the bolt 119 is sequentially inserted to the installation hole 115a of the lower bracket 113 and the bolt insertion hole 111 of the lower mount bracket 97, and then is fastened to the welded nut 133 of the support bracket 99. Since the fixing operation surface where the fixed surface 121b of the lower mount bracket 97 and the fixed surface 131 of the support bracket 99 abut on each other is inclined so as to face downward to the rear side of the vehicle body, the above-described fastening operation is facilitated. Moreover, interference by a fixing tool 145 shown in FIG. 13 for use in the fastening operation to the steering column 91 can be prevented. Accordingly, the fastening operation can be securely performed.

Furthermore, the support bracket 99 is pushed and bent by the steering column mount bracket 93, thus dimensional variation between the dash module 25 and the vehicle body 27 can be absorbed. Therefore, an exclusive mechanism for absorbing the variation is not required, and the above-described variation can be absorbed by a simplified configuration.

As described above, by fixing the steering column 91 to the support bracket 99 at the dash panel 29 via the steering column mount bracket 93, the vibration of the steering column 91 during the vehicle running or the like is restricted, and the performance of the steering column 91 against the vibration is thus improved.

The entire contents of Japanese Patent Application No. 2000-169188 (filed Jun. 6, 2000) is incorporated herein by reference.

Although the invention has been described above by reference to a certain embodiment of the invention, the invention is not limited to the embodiment described above. Modifications and variations of the embodiments described above will occur to those skilled in the art, in light of the above teachings.

What is claimed is:

1. An automotive dash module installation structure, comprising:
   an insertion hole portion provided in any one of a dash module and a dash panel at a vehicle body side, the dash module having various parts assembled thereto with a steering member as a main constituent;
   a protrusion provided in the other one of said dash module and the dash panel, the protrusion being inserted to said insertion hole portion;
   a positioning pin provided in at least one end portion of both ends in a vehicle width direction of the vehicle body side, the positioning pin extending in the vehicle width direction; and
   a guide groove provided in the dash module, the guide groove receiving the positioning pin and extending in a fore-and-aft direction of the vehicle body, the guide groove having an end edge with a concave portion into which the positioning pin enters to temporarily hold the dash module, the concave portion extending in any one of upper and lower direction;
   a temporarily holding claw provided in any one of the other end portion of both ends in the vehicle width direction of said steering member and the vehicle body side corresponding thereto, the temporarily holding claw extending in the fore-and-aft direction of the vehicle body; and
   a temporarily holding hole portion provided in the other one of the other end portion of said steering member and the vehicle body side, the temporarily holding hole portion receiving the temporarily holding claw and temporarily holding the dash module to the vehicle body,
   wherein said positioning pin and guide groove are formed so as to guide the insertion of said protrusion into said insertion hole portion in cooperation with a movement of said positioning pin along said guide groove when said dash module is installed to the vehicle body,
   wherein a vicinity of said temporarily holding claw is fastened with a fastener toward a front of the vehicle body.

2. The automotive dash module installation structure according to claim 1, wherein a temporarily holding claw installing bracket including said temporarily holding claw and fixed to the vehicle body is provided at the end portion of said steering member, and said temporarily holding claw is provided at the vehicle body side.

3. The automotive dash module installation structure, comprising:
   an insertion hole portion provided in any one of a dash module and a dash panel at a vehicle body side, the dash module having various parts assembled thereto with a steering member as a main constituent;
   a protrusion provided in the other one of said dash module and the dash panel, the protrusion being inserted to said insertion hole portion;
   a positioning pin provided in at least one end portion of both ends in a vehicle width direction of the vehicle body side, the positioning pin extending in the vehicle width direction; and
   a guide groove provided in the dash module, the guide groove receiving the positioning pin and extending in a fore-and-aft direction of the vehicle body, the guide groove having an end edge with a concave portion into which the Positioning pin enters to temporarily hold the dash module, the concave portion extending in any one of upper and lower direction,
   wherein said positioning pin and guide groove are formed so as to guide the insertion of said protrusion into said insertion hole portion in cooperation with a movement of said positioning pin along said guide groove when said dash module is installed to the vehicle body,
   wherein a pair of said positioning pins and a pair of said guide grooves are provided in a vertical direction of the vehicle body, and at least one of said end edges of said two of upper and lower guide grooves has a horizontal escape portion formed therein, the horizontal escape portion extending further than said positioning concave portion in the fore-and-aft direction of the vehicle body.

4. The automotive dash module installation structure according to claim 3, wherein a convex curved portion is continuous between said positioning concave portion and said horizontal escape portion.

5. The automotive dash module installation structure, comprising:

an insertion hole portion provided in any one of a dash module and a dash panel at a vehicle body side, the dash module having various parts assembled thereto with a steering member as a main constituent;

a protrusion provided in the other one of said dash module and the dash panel, the protrusion being inserted to said insertion hole portion;

a positioning pin provided in at least one end portion of both ends in a vehicle width direction of the vehicle body side, the positioning pin extending in the vehicle width direction;

a guide groove provided in the dash module, the guide groove receiving the positioning pin and extending in a fore-and-aft direction of the vehicle body, the guide groove having an end edge with a concave portion into which the positioning pin enters to temporarily hold the dash module, the concave portion extending in any one of upper and lower direction;

a temporarily holding claw provided in any one of the other end portion of both ends in the vehicle width direction of said steering member and the vehicle body side corresponding thereto, the temporarily holding claw extending in the fore-and-aft direction of the vehicle body; and a temporarily holding hole portion provided in the other one of the other end portion of said steering member and the vehicle body side, the temporarily holding hole portion receiving the temporarily holding claw and temporarily holding the dash module to the vehicle body, wherein said positioning pin and guide groove are formed so as to guide the insertion of said protrusion into said insertion hole portion in cooperation with a movement of said positioning pin along said guide groove when said dash module is installed to the vehicle body, wherein a vicinity of said temporarily holding claw is fastened with a fastener toward a front of the vehicle body, wherein each length in the fore-and-aft direction of the vehicle body of said protrusion and said temporarily holding claw is set in a manner that said temporarily holding hole portion receives said temporarily holding claw before said protrusion is inserted to said insertion hole portion when said dash module is installed to the vehicle body.

6. The automotive dash module installation structure, comprising:

an insertion hole portion provided in any one of a dash module and a dash panel at a vehicle body side, the dash module having various parts assembled thereto with a steering member as a main constituent;

a protrusion provided in the other one of said dash module and the dash panel, the protrusion being inserted to said insertion hole portion;

a positioning pin provided in at least one end portion of both ends in a vehicle width direction of the vehicle body side, the positioning pin extending in the vehicle width direction;

a guide groove provided in the dash module, the guide groove receiving the positioning pin and extending in a fore-and-aft direction of the vehicle body, the guide groove having an end edge with a concave portion into which the positioning pin enters to temporarily hold the dash module, the concave portion extending in any one of upper and lower direction;

a temporarily holding claw provided in any one of the other end portion of both ends in the vehicle width direction of said steering member and the vehicle body side corresponding thereto, the temporarily holding claw extending in the fore-and-aft direction of the vehicle body;

a temporarily holding hole portion provided in the other one of the other end portion of said steering member and the vehicle body side, the temporarily holding hole portion receiving the temporarily holding claw and temporarily holding the dash module to the vehicle body; and a sealant provided between any one of the dash module and the dash panel, which is around said protrusion, and a rim of said insertion hole portion, the sealant being compressed in a state where the dash module is installed to a normal position of the vehicle body and sealing said insertion hole portion, wherein said sealant holds an uncompressed state when said temporarily holding claw is engaged with said temporarily holding hole portion to temporarily hold the dash module to the vehicle body, wherein said positioning pin and guide groove are formed so as to guide the insertion of said protrusion into said insertion hole portion in cooperation with a movement of said positioning pin along said guide groove when said dash module is installed to the vehicle body, wherein a vicinity of said temporarily holding claw is fastened with a fastener toward a front of the vehicle body.

7. A method of installing an automotive dash module having various parts assembled therein with a steering member as a main constituent to a dash portion of a vehicle body, said method comprising:

guiding a positioning pin provided in at least one end portion of both ends in a vehicle width direction of a vehicle body side, the positioning pin extending in the vehicle width direction, to a guide groove provided in the end portion of said dash module, the guide groove extending in a fore-and-aft direction of the vehicle body;

inserting a temporarily holding claw provided in any one of the other end portion of the both ends in the vehicle width direction of said steering member and the vehicle body side corresponding thereto, the temporarily holding claw extending in the fore-and-aft direction of the vehicle body, to a temporarily holding hole portion provided in the other one of the other end portion of said steering member and the vehicle body side, to temporarily hold said dash module to the vehicle body; and moving said dash module further ahead after said positioning pin is guided to the guide groove so that positioning pin abuts an end edge of the guide groove and enters into a concave portion of the guide groove to temporarily hold the dash module and said temporarily holding claw is inserted to the temporarily holding hole portion, thereby inserting a protrusion to a through hole portion formed on a dash panel, the protrusion protruding ahead from a part assembled to said dash module, wherein said positioning pin and guide groove are formed so as to guide the insertion of said protrusion into said insertion hole in cooperation with a movement of said positioning pin along said guide groove when said when said dash module is installed to the vehicle body.

8. The method of installing an automotive dash module according to claim 1, wherein a steering column mount bracket provided in said steering member and having the steering column fixed thereto pushes a support bracket provided in the dash panel to bend the same when the dash module is installed to the vehicle body.

9. The method of installing an automotive dash module according to claim 7, wherein said steering column mount bracket abuts on said support bracket on a way where said positioning pin is guided to the guide groove, and said support bracket is bent in the following process of installation operation for the same.

* * * * *